3,288,791
1,2-DIACYLHEXAHYDROPYRIDAZINES AND PREPARATION THEREOF

Robert L. Clarke, Bethlehem, N.Y., assignor to Sterling Drug Inc., New York, N.Y., a corporation of Delaware
No Drawing. Filed Aug. 31, 1959, Ser. No. 836,911
4 Claims. (Cl. 260—250)

This invention relates to bis-amide compounds, and in particular is concerned with hexahydropyridazines having acyl radicals in the 1- and 2-positions, and the preparation thereof.

In the 1,2-diacylhexahydropyridazines of the invention the acyl radicals are derived from hydrocarbon carboxylic acids having from one to about ten carbon atoms. They are represented by the following structural formula

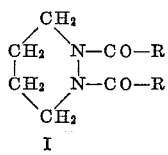

I wherein R represents hydrogen or a hydrocarbon radical having from one to about nine carbon atoms; or the two R's can be joined to form an alpha,beta-lower-alkylene bridge, thus producing a 1,6-diaza-2,5-dioxobicyclo[4.4.0]decane compound. In the above general Formula I, when the R's represent separate radicals, they are preferably identical. When R represents a hydrocarbon radical, it preferably stands for an aliphatic hydrocarbon radical, either saturated or unsaturated, straight or branched; a cycloalkyl radical; a monocarbocyclic aromatic hydrocarbon radical; or a combination of the foregoing radicals. Thus, included in the definition of R are alkyl, for example, methyl, ethyl, propyl, isopropyl, butyl, tertiary-butyl, hexyl, octyl and nonyl; alkenyl, for example, vinyl, 1-propenyl, allyl, 3-hexenyl and 4-octenyl; alkynyl, for example, ethynyl, propargyl and 3-hexynyl; cycloalkyl, for example, cyclopropyl, cyclobutyl, cyclopentyl, cyclohexyl, 4-methylcyclohexyl, 2,6-dimethylcyclohexyl, and cyclooctyl; cycloalkylalkyl, for example, cyclopentylethyl and cyclohexylmethyl; monocarbocyclic aryl, for example, phenyl, p-tolyl, 3,5-dimethylphenyl and 2-ethylphenyl; and monocarbocyclic aryl-lower-alkyl, for example, benzyl, 2-phenylethyl and 3-phenylpropyl.

When the two R's in Formula I are joined to form an alpha,beta-lower-alkylene bridge, the compounds thus produced can be represented by the following structural formula

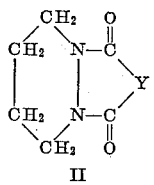

II wherein Y represents an alpha,beta-lower-alkylene bridge. In other words, Y represents a lower-alkylene radical in which the free valence bonds are on adjacent carbon atoms, that is, ethylene or lower-alkyl substituted ethylene. The lower-alkylene bridge preferably has from two to about six carbon atoms and includes such radicals as ethylene, 1-methylethylene, 1-ethylethylene, 1,2-dimethylethylene, 1,2-diethylethylene, 1-butylethylene, and the like.

The compounds of the invention are prepared by reacting hexahydropyridazine or an acid-addition salt thereof with an acid anhydride or acid halide derived from a hydrocarbon carboxylic acid having from one to about ten carbon atoms.

In the cases wherein the R's in Formula I represent separate but identical hydrocarbon radicals, the procedure is carried out by treating hexahydropyridazine or salt thereof with at least two molar equivalents of the appropriate acid halide or acid anhydride. The reaction takes place at room temperature, with or without the use of an inert solvent, although the reaction can be accelerated by heating.

If an acid halide (chloride or bromide) is employed as the acylating agent and the starting material is an acid-addition salt of hexahydropyridazine, it is preferred to carry out the reaction in the presence of dilute aqueous alkali, e.g., sodium hydroxide or potassium hydroxide, which takes up the hydrogen halide produced and drives the reaction to completion.

Compounds of Formula II are prepared by reacting hexahydropyridazine with an anhydride having the formula

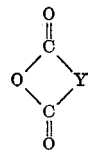

The reaction is believed to take place by way of the intermediate amido-acid

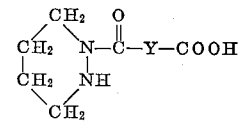

and the cyclization to a compound of formula II takes place upon heating at a temperature between about 150° C. to 300° C.

In the case where R represents hydrogen, the acyl radicals are formyl radicals (COH). Formylation is brought about by reacting hexahydropyridazine with a mixture of formic acid and acetic anhydride. This mixture is believed to behave as a mixed anhydride, formic acetic anhydride, which serves as a formylating agent.

Chemotherapeutic and pharmacological evaluation of the compounds of the invention has shown that they possess antiviral and diuretic activity. They have a very low toxicity in mammals. Toxic manifestations appear only at doses far greater than the effective antiviral and diuretic doses. The compounds are prepared for use in the form of solutions or suspensions in pharmaceutically acceptable liquid media for parenteral administration, or in powder or tablet form with conventional excipients for oral administration.

The structure of the compounds is established by the mode of preparation and by the agreement of the values found in elementary analysis with those calculated for the expected empirical formulas.

The following examples will further illustrate my invention without the latter being limited thereby.

*Example 1.—1,2-diacetylhexahydropyridazine*

A mixture of 9.0 g. (0.0735 mole) of hexahydropyridazine hydrochloride and 20.8 ml. (22.5 g., 0.22 mole) of acetic anhydride was heated for one hour on a steam bath, then cooled and poured into 50 ml. of cold water. The mixture was then made alkaline with 35% sodium hydroxide and extracted three times with ether. The ether extracts were dried over anhydrous sodium sulfate and concentrated. The residue, which crystallized on cooling, was recrystallized first from petroleum ether (Skellysolve B), then from ethanol with precipitation by adding petroleum ether, and finally from ethanol alone, to give 1,2-diacetylhexahydropyridazine in the form of colorless, massive prisms, M.P. 59.9–62.9° C. (corr.).

*Analysis.*—Calcd. for $C_8H_{14}N_2O_2$: C, 56.45; H, 8.29; N, 16.46. Found: C, 56.83; H, 8.52; N, 16.70.

1,2-diacetylhexahydropyridazine, when tested in dogs at a dose level of 7.5 mg./kg. was found to have a diuretic activity greater than that of theophylline and a chloruretic activity equal to or greater than that of theophylline.

Example 2

1,2-diformylhexahydropyridazine can be prepared by carrying out the manipulative procedure of Example 1 in the presence of an excess of formic acid.

Example 3

1,2-dipropionylhexahydropyridazine can be prepared by replacing the acetic anhydride in Example 1 by a molar equivalent amount of propionic anhydride.

Example 4

1,2-dicaproylhexahydropyridazine can be prepared by replacing the acetic anhydride in Example 1 by a molar equivalent amount of caproic anhydride.

Example 5

1,2-diisobutyrylhexahydropyridazine can be prepared by replacing the acetic anhydride in Example 1 by a molar equivalent amount of isobutyric anhydride.

Example 6.—*1,2-dibenzoylhexahydropyridazine*

A mixture of 6.1 g. (0.05 mole) of hexahydropyridazine hydrochloride and 12.4 ml. (15 g., 0.10 mole) of benzoyl chloride was heated on a steam bath. Dioxane (10 ml.) was then added and the mixture boiled for about fifteen minutes. The reaction mixture was cooled, poured into dilute sodium hydroxide and shaken thoroughly. The solid product was collected by filtration and recrystallized from 60 ml. of absolute ethanol, to give 10.3 g. of 1,2-dibenzoylhexahydropyridazine in the form of heavy needle clusters, M.P. 131.1–133.2° C. (corr.).

*Analysis.*—Calcd. for $C_{18}H_{18}N_2O_2$: C, 73.46; H, 6.16; N, 9.52. Found: C, 73.14; H, 6.05; N, 9.53.

Example 7

1,2-didecanoylhexahydropyridazine can be prepared by replacing the benzoyl chloride in Example 6 by a molar equivalent amount of decanoyl chloride.

Example 8

1,2-diacryloylhexahydropyridazine can be prepared by replacing the benzoyl chloride in Example 6 by a molar equivalent amount of acryloyl chloride.

Example 9

1,2-dipropioloylhexahydropyridazine can be prepared by replacing the benzoyl chloride in Example 6 by a molar equivalent amount of propioloyl chloride (acetylenecarboxylic acid chloride).

Example 10

1,2-dicyclohexanecarbonylhexahydropyridazine can be prepared by replacing the benzoyl chloride in Example 6 by a molar equivalent amount of cyclohexanecarboxylic acid cholride.

Example 11

1,2-dicyclopentylacetylhexahydropyridazine can be prepared by replacing the benzoyl chloride in Example 6 by a molar equivalent amount of cyclopentylacetyl chloride.

Example 12

1,2 - bis($\beta$ - phenylpropionyloxy)hexahydropyridazine can be prepared by replacing the benzoyl chloride in Example 6 by a molar equivalent amount of $\beta$-phenylpropionyl chloride.

Example 13.—*1,6-diaza-2,5-dioxobicyclo[4.4.0]decane*

[II; Y is $CH_2CH_2$]

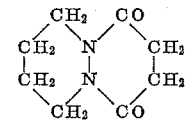

Hexahydropyridazine hydrochloride (10.0 g., 0.0816 mole) was neutralized with 35% sodium hydroxide solution, and the free base was extracted with 200 ml. of benzene. The benzene extract was dried over solid sodium hydroxide and decanted, and 8.1 g. (0.081 mole) of succinic anhydride in 200 ml. of hot benzene was added. The reaction mixture was heated for two hours on a steam bath, the solvent removed in vacuo, and the residual oil heated for five minutes at 250° C. The product solidified upon cooling and it was recrystallized twice from 85 ml. of ethanol to give 10 g. of 1,6-diaza-2,5-dioxobicyclo[4.4.0]decane in the form of colorless prisms, M.P. 177.8–179.9° C. (corr.).

*Analysis.*—Calcd. for $C_8H_{12}N_2O_2$: C, 57.12; H, 7.19; N, 16.66. Found: C, 57.22; H, 7.21; N, 16.48.

1,6-diaza-2,5-dioxobicyclo[4.4.0]decane evidenced activity against Semliki Forest virus when fed to rats at a concentration of 0.01% in the diet.

Example 14

1,6-diaza-2,5-dioxo-3-methylbicyclo[4.4.0]decane having the formula

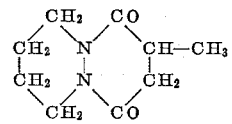

can be prepared by replacing the succinic anhydride in Example 13 by a molar equivalent amount of $\alpha$-methylsuccinic anhydride.

Example 15

1,6 - diaza-3,4-dimethyl-2,5-dioxbicyclo[4.4.0]decane having the formula

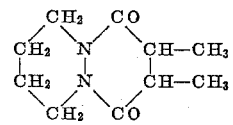

can be prepared by replacing the succinic anhydride in Example 13 by a molar equivalent amount of $\alpha,\beta$-dimethylsuccinic anhydride.

I claim:
1. Compound having the formula

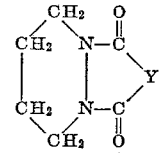

wherein Y is lower-alkylene in which the free valence bonds are on adjacent carbon atoms.

2. 1,2,-diacetylhexahydropyridazine.
3. 1,2-dibenzoylhexahydropyridazine.
4. 1,6-diaza-2,5-dioxobicyclo[4.4.0]decane.

(References on following page)

References Cited by the Examiner

UNITED STATES PATENTS

| | | | |
|---|---|---|---|
| 2,841,584 | 7/1958 | Hunter | 260—250 |
| 2,921,068 | 1/1960 | Clarke et al. | 260—250 |

OTHER REFERENCES

Bacchetti: Chemical Abstracts, vol. 46 (1952), columns 994–5, Abstract of Gazz. Chim. Ital., vol. 80, 783–7 (1950).

Feuer et al.: J. American Chemical Society, vol. 73 (1951), pages 4716–9.

Migrdichian: Organic Synthesis, vol. I (1957), page 483.

Stetter et al.: Chemische Berichte, vol. 91, pages 1982–8 (Sept. 15, 1958).

ALEX MAZEL, *Primary Examiner.*

IRVING MARCUS, *Examiner.*

HENRY R. JILES, *Assistant Examiner.*